United States Patent
Kawamura et al.

(10) Patent No.: US 10,356,402 B2
(45) Date of Patent: Jul. 16, 2019

(54) VIDEO ENCODING DEVICE AND VIDEO DECODING DEVICE

(71) Applicant: KDDI Corporation, Tokyo (JP)

(72) Inventors: Kei Kawamura, Saitama (JP); Sei Naito, Saitama (JP)

(73) Assignee: KDDI CORPORATION, Tokyo (JP)

(*) Notice: Subject to any disclaimer, the term of this patent is extended or adjusted under 35 U.S.C. 154(b) by 703 days.

(21) Appl. No.: 14/781,131

(22) PCT Filed: Mar. 26, 2014

(86) PCT No.: PCT/JP2014/058635
§ 371 (c)(1),
(2) Date: Sep. 29, 2015

(87) PCT Pub. No.: WO2014/157386
PCT Pub. Date: Oct. 2, 2014

(65) Prior Publication Data
US 2016/0057417 A1 Feb. 25, 2016

(30) Foreign Application Priority Data
Mar. 29, 2013 (JP) .................. 2013-074975

(51) Int. Cl.
| | |
|---|---|
| H04N 19/597 | (2014.01) |
| H04N 19/119 | (2014.01) |
| H04N 19/593 | (2014.01) |
| H04N 19/154 | (2014.01) |
| H04N 19/187 | (2014.01) |

(52) U.S. Cl.
CPC ......... *H04N 19/119* (2014.11); *H04N 19/154* (2014.11); *H04N 19/187* (2014.11); *H04N 19/593* (2014.11); *H04N 19/597* (2014.11)

(58) Field of Classification Search
CPC ............................ H04N 19/119; H04N 19/597
See application file for complete search history.

(56) References Cited

U.S. PATENT DOCUMENTS

2007/0237406 A1* 10/2007 Yamamoto ........... H04N 19/176
 382/232
2014/0247872 A1* 9/2014 Merkle ............... H04N 19/597
 375/240.12

(Continued)

FOREIGN PATENT DOCUMENTS

| JP | 10-162118 A | 6/1998 |
|---|---|---|
| JP | 2004-200894 A | 7/2004 |

(Continued)

OTHER PUBLICATIONS

Notification concerning Transmittal of International Preliminary Report on Patentability and International Preliminary Report on Patentability for International Application No. PCT/JP2014/058635, dated Oct. 8, 2015, 14 pages.

(Continued)

*Primary Examiner* — Rowina J Cattungal
(74) *Attorney, Agent, or Firm* — Westman, Champlin & Koehler, P.A.

(57) ABSTRACT

The invention relates to a video encoding device and a video decoding device, and reduces the amount of calculation when applying depth intra-prediction for depth maps, targeting textures and depth maps at respective viewpoints in a multi-view video image. Average calculations and SAD calculations are performed in respective calculation target regions partitioned by wedgelets, and a wedgelet with the minimum SAD for the block is used for prediction. Here, partitioning a target block into sub-blocks and limiting a calculation target region by determining whether to include each sub-block in a calculation target region with each wedgelet based on a region where said wedgelet passes in each sub-block enables reducing the amount of calculation.

14 Claims, 7 Drawing Sheets

(56) References Cited

U.S. PATENT DOCUMENTS

| | | | | |
|---|---|---|---|---|
| 2014/0253682 A1* | 9/2014 | Zhang | ............... | H04N 19/597 348/43 |
| 2014/0341289 A1* | 11/2014 | Schwarz | ............. | H04N 19/597 375/240.16 |
| 2014/0341292 A1* | 11/2014 | Schwarz | ............. | H04N 19/597 375/240.16 |
| 2015/0245061 A1* | 8/2015 | Chen | .................. | H04N 19/597 375/240.13 |

FOREIGN PATENT DOCUMENTS

| | | | | |
|---|---|---|---|---|
| JP | 2005-277968 A | 10/2005 | | |
| WO | 2011/135841 A1 | 11/2011 | | |
| WO | WO 2014005248 A1 * | 1/2014 | ........... | H04N 19/597 |

OTHER PUBLICATIONS

International Search Report and Written Opinion for PCT Application No. PCT/JP2014/058635, dated Jun. 17, 2014, 8 pages.

Kawamura, Kei et al., "3D-CE6.h related: Calculation Sample Reduction for Depth Modeling Mode 1 and 3", Joint Collaborative Team on 3D Video Coding Extension Development of ITU-T SG 16 WP 3 and ISO/IEC JTC 1/SC 29/WG 11 JCT3V-C0230, ITU-T, Jan. 17, 2013, pp. 1-3.

Sato, Masaharu et al., "A Study on decoder complexity reduction of Depth coding in 3 D-HEVC", Proceedings of the 2013 IEICE General Conference Joho System 2, The Institute of Electronics, Information and Communication Engineers, Mar. 5, 2013 (Mar. 5, 2013), p. 47.

Tech, Gerhard, "MV-HEVC Draft Text 2", Joint Collaborative Team on 3D Video Coding Extension Development of ITU-T SG 16 WP 3 and ISO/IEC JTC 1/SC 29/WG 11 JCT3V-B1004_d0, Oct. 13-19, 2012, 22 pages.

International Standard ISO/IEC 14496-10, Second Edition Oct. 1, 2004, Information technology—Coding of audio-visual objections—Part 10: Advanced Video Coding, 280 pages.

Tech, Gerhard, "3D-HEVC Test Model 2", Joint Collaborative Team on 3D Video Coding Extension Development of ITU-T SG 16 WP 3 and ISO/IEC JTC 1/SC 29/WG 11 JCT3V—B1005_d0, 118 pages.

* cited by examiner

VIDEO ENCODING DEVICE AND VIDEO DECODING DEVICE

CORSS-REFERENCE TO RELATED APPLICATION

This Application is a section of 371 National Stage Application of International Application No. PCT/JP2014/058635, filed 26 Mar. 2014 and published as WO 2014/157386 A1 on 2 Oct. 2014, in Japanese, the contents of which are hereby incorporated by reference in their entirety.

TECHNICAL FIELD

The present invention relates to a video encoding device and a video decoding device, and more particularly, to a video encoding device and a video decoding device that apply depth intra-prediction for depth maps, targeting textures and depth maps at respective viewpoints in a multi-view video image.

BACKGROUND ART

As disclosed in Non-Patent Literature 1, an international standard MVC which is an extension of Advanced Video Coding (AVC) has been standardized as Multiview Video Coding. Also, as described in Non-Patent Literature 2, Multi-View High Efficiency Video Coding (MV-HEVC) which is an extension of High Efficiency Video Coding (HEVC) is in the process of standardization as an international standard.

Further, in addition to the above, an encoding system targeting a multi-view video image (textures) and depth maps has been studied as described in Non-Patent Literature 3.

FIG. 10 is a view conceptually showing a data configuration of said multi-view video image with associated depth maps targeted for encoding. As illustrated, textures 1 to n are provided as images shot at respective viewpoints 1 to n corresponding to respective camera positions, depth maps 1 to n are prepared for the textures 1 to n, respectively, and such data is prepared at respective times t.

Textures i (i=1, 2, . . . , n) at respective pixel locations (x, y) of which the values d(x, y) of depths of an object that is being shot from a camera that is performing that shooting are provided serve as depth maps i (i=1, 2, . . . , n). Such textures and depth maps can be used variously for generation of a video image at an arbitrary viewpoint other than the respective viewpoints 1 to n and other purposes.

In addition, depth maps are prepared by an existing method. For example, using a positional relationship between the respective viewpoints and respective camera parameters, etc., and then performing a processing such as association of identical characteristic points between the respective textures i allows for preparing the respective depth maps i.

In an encoding system targeting said textures i and the depth maps i at the respective viewpoints i (i=1, 2, . . . , n), as described in Non-Patent Literature 3, the following methods can be applied. First, for the textures, an ordinary video encoding system (system in Non-Patent Literatures 1, 2, and the like) constituted of intra-prediction, motion compensation, and transformation/quantization of a prediction residue can be used.

On the other hand, because the depth maps can also be regarded as "images" having depth values as pixel values, the above-described video encoding system (ordinary system) identical to that for the textures can be applied thereto. Further, in place of said ordinary system, or in combination with said ordinary system, depth intra-prediction dedicated to the depth maps may also be used.

In addition, here, the depth maps have signal characteristics that are greatly different from those of the textures, and therefore, dedicated depth intra-prediction is prepared therefor. One of the signal characteristics of the depth maps is that a sharp edge occurs because of a difference in depth at an object boundary, while an object surface has relatively small changes in depth.

That is, as in a case such as with a "person" as a first object that exists at a near side and a "wall" as a second object that exists behind the person as a background, there is a characteristic that average depths within objects are greatly different if the objects are different.

Hereinafter, a method for depth intra-prediction described in Non-Patent Literature 3 will be described. Said method consists of the following [procedure 1] to [procedure 4]. FIG. 11 includes views for describing said method.

[Procedure 1] Prepare wedge list

[Procedure 2] Calculate average value for every region

[Procedure 3] Determine wedgelet by SAD calculations

[Procedure 4] Generate depth value prediction image

In [procedure 1], a wedge list listing a plurality of wedgelets to serve as search targets is prepared. The wedgelets are object boundaries (such as, for example, a boundary between a person and a wall being a background) in a block within a depth map that have been modeled as straight lines.

In FIG. 11(1), a block B0 serving as a prediction target is shown, and from four sides L1 to L4 of said block B0, points (points of pixel locations) that belong to two different sides are selected and connected to be a line segment, which serves as a wedgelet. As shown in, for example, FIG. 11(2), a line segment W1 connecting a point P1 on the side L4 and a point P2 on the side L3 serves as a wedgelet, and by said wedgelet W1, the block B0 is partitioned into regions R1 and R2.

By enumerating as candidates all possible wedgelets each constituted as said line segment connecting two points on two different sides, a wedge list is prepared in [procedure 1].

In [procedure 2], average values of texture signals (or depth signals) are determined in the two partitioned regions, respectively, in terms of each of the wedgelets in the wedge list. For example, in terms of the wedgelet W1 in FIG. 11(2), an average value m(R1) and an average value m(R2) of the partitioned region R1 and region R2 are determined, respectively.

In [procedure 3], first, sums of absolute differences (SADs) of the average values calculated in [procedure 2] for the two partitioned regions and texture signal values (or depth signal values) are determined in terms of each of the wedgelets in the wedge list, and a SAD with that wedgelet is determined for the block as a whole of a prediction target as a sum of said SADs in the two regions.

For example, a SAD[W1] with the wedgelet W1 in FIG. 11(2) is provided by the following (Expression 1) where a signal value at a location (x, y) in the block B0 is provided as s(x, y). (The signal value is a texture or depth signal value.)

[Equation 1]

$$SAD[W1] = \sum_{(x,y) \in R1} |s(x, y) - m(R1)| + \sum_{(x,y) \in R2} |s(x, y) - m(R2)|$$ (Expression 1)

In [procedure 3], further, such a wedgelet Wi that a SAD[Wi] calculated in the same manner as the above (Expression 1) in terms of each of the wedgelets Wi (i=1, 2, ..., N) in the wedge list is minimized is determined as one to be used for prediction.

In [procedure 4], a prediction image of depth values with that prediction target block is generated by the wedgelet Wi determined as one to provide the minimum value in the above [procedure 3]. Said prediction image is generated as one in two regions of which partitioned by the wedgelet Wi their respective representative values are provided (by respective methods of an encoder/decoder). For the representative values, average values of the respective regions can be typically used, but other values calculated in said regions may be adopted.

In addition, the prediction "image" of depth values (depth signals) is called an "image" because of the point that predicted depth values are mapped to pixel positions. Alternatively, this may called a prediction depth map of depth values.

For example, when the wedgelet W1 in FIG. 11 is determined as one to provide the minimum value, a prediction image of the block B0 is an image having signal values at all locations in the region R1 that correspond to its representative value dR1 and having signal values at all locations in the region R2 that correspond to its representative value dR2.

As is apparent from the above [procedure 1] to [procedure 4], depth intra-prediction by a wedgelet is a prediction method suitable for such a case that, in a block of a prediction target, an object boundary such as to cross said block almost linearly exists, and the depth value sharply changes at said boundary.

CITATION LIST

Non-Patent Literature

Non-Patent Literature 1 ISO/IEC 14496-10 MPEG-4 Part 10, Advanced Video Coding
Non-Patent Literature 2 JCT3V-B1004, MV-HEVC Draft Text 2
Non-Patent Literature 3 JCT3V-B1005, 3D-HEVC Test Model 2

SUMMARY OF INVENTION

Technical Problem

However, depth intra-prediction has had a problem that the amount of calculation is large. That is, a large number of wedgelets are prepared as candidates by all combinations of two points on two different sides in a form of a wedge list in [procedure 1]. Because it is necessary to search for a wedgelet to provide the minimum value in [procedure 2] and [procedure 3] among said large number of candidates, the amount of calculation therefor is large.

In Non-Patent Literature 3, the following (first and second means) have been studied as means for reducing the amount of calculation due to such a full search as described above.

As the first means, as shown in FIG. 12, the search is performed in two steps. That is, edge points of a line segment to constitute a wedgelet are not selected from all locations on the sides of a block, but are selected from only locations having been thinned out so as to include one point every two points.

FIG. 12 is an example in which the amount of calculation is reduced by applying to said two steps to a series of wedgelets each generated by selecting two points on the side L1 or L2 as a part of the wedge list when the target block B0 shown in FIG. 11(1) has a size of 8×8.

In the case of non-application, 7×7=49 patterns of wedgelets are provided as search targets using seven points (1, 2) to (1, 8) on L1 and seven points (2, 1) to (8, 1) on L2 as end points. On the other hand, when the two steps are applied, wedgelets reduced to 3×3=9 patterns are provided as search targets using three points (1, 3), (1, 5), and (1, 7) on L1 and three points (3, 1), (5, 1), and (7, 1) on L2 as end points if selected from only the points displayed in gray.

Further, in the first means, a final solution is obtained by determining the minimum solution in the wedge list after said reduction and then performing a search without applying the two steps in neighboring wedgelets to said minimum solution.

For example, if a wedgelet connecting (1, 5) and (5, 1) is the smallest solution with the two steps, by adding to each end point neighboring points on both sides as its neighborhood to perform a search again in a wedge list of {(1, 4), (1, 5), (1, 6)} and {(4, 1), (5, 1), (6, 1)} thus prepared with no application of the two steps, a final solution is provided. In this case, 3×3=9 patterns are provided as targets. Eighteen patterns of searches are performed in total including the 9 patterns with the two steps, which thus shows a reduction from the 49 patterns with no application of the two steps.

As the second means, as shown in FIG. 13 by way of example, when intra-prediction has been applied to a neighborhood block and a direction of prediction exists, only wedgelets in line with the prediction direction constitute a wedge list.

In FIG. 13, intra-prediction as shown by a direction D1 has been applied in a block B1 adjacent to a target block B0 is applied. In this case, in the block B0, using a wedge list constituted only of wedgelets (e.g., W11 and W12, etc.) that are parallel to the direction D1 allows greatly reducing the total number of searches.

Without being limited to the method studied in Non-Patent Literature 3 as above, a method for reducing the amount of calculation in depth intra-prediction has been demanded.

In view of the above-described problems, an object of the present invention is to provide a video encoding device and a video decoding device that allow reducing the amount of calculation in depth intra-prediction.

Solution to Problem

In order to achieve the object, the present invention provides a video encoding device which applies prediction to textures and depth maps at respective viewpoints in a multi-view video image and performs transformation and quantization for encoding, and a video decoding device which performs inverse transformation and inverse quantization when decoding textures and depth maps at respective viewpoints in a multi-view video image having been encoded and applies prediction for decoding. The present invention is first characterized in that the video encoding device and the video decoding device each includes a depth intra-prediction unit that applies prediction for a depth map, said depth intra-prediction unit comprising: a wedge list preparing unit that prepares or holds a wedge list for which wedgelets each partitioning a target block into two regions by a line segment are enumerated; a calculation region limiting unit that, with respect to each wedgelet in the wedge list, limits a calculation target region to a neighborhood of where said wedgelet passes within a target block; an average value calculating unit that, in each of the regions partitioned in a target block into two by each wedgelet, calculates an average value of texture signals in the limited calculation region; a difference evaluating unit that calculates, with respect to each wedgelet, a difference between the calculated average value and a texture signal in the limited calculation region; and a prediction value generating unit that partitions a target block into two regions by a wedgelet with which the calculated difference is minimized, and generates a prediction signal of a depth map as a representative value of depth signals in each region.

Also, the present invention is second characterized in that said calculation region limiting unit, with respect to each wedgelet in the wedge list, limits a calculation target region by a uniform thinning-out processing within a target block, instead of by limiting a calculation target region to a neighborhood of where said wedgelet passes within a target block.

Advantageous Effects of Invention

According to the first characteristic, a calculation target region is limited to a neighborhood of where a wedgelet passes, so that the amount of calculation is reduced.

According to the second characteristic, a calculation target region is limited by a uniform thinning-out processing within a target block, so that the amount of calculation is reduced.

DESCRIPTION OF EMBODIMENTS

Figure 1:
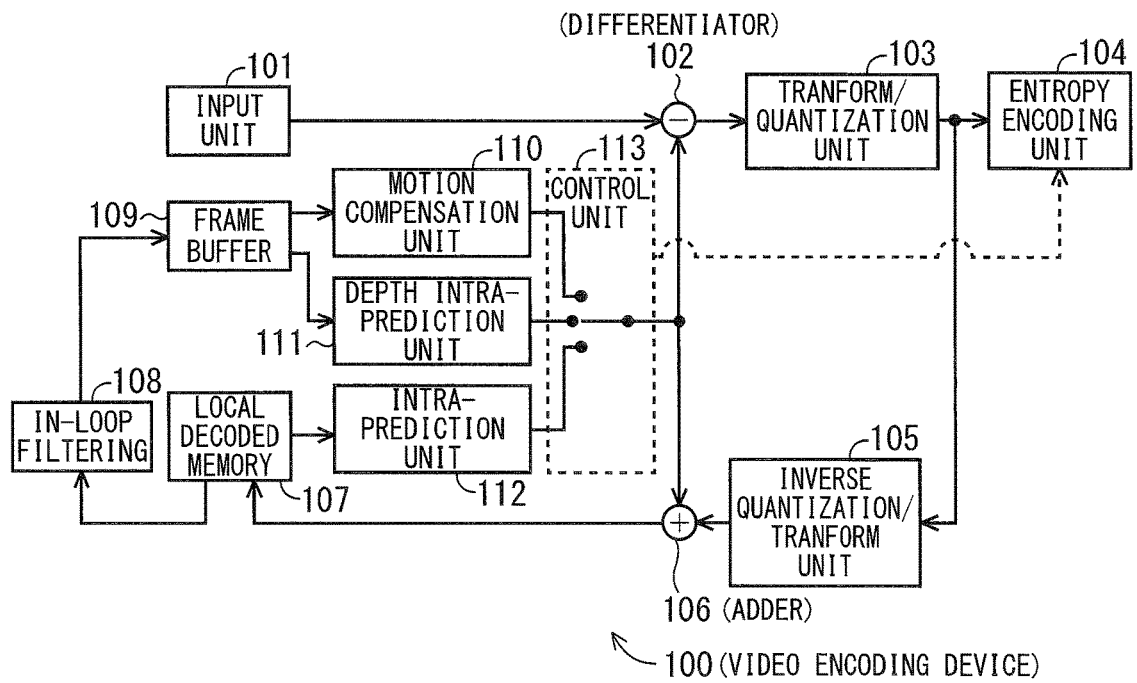
FIG. 1 is a functional block diagram of a video encoding device according to an embodiment.

FIG. 1 is a functional block diagram of a video encoding device according to an embodiment of the present invention. The video encoding device 100 includes an input unit 101, a differentiator 102, a transform/quantization unit 103, an entropy encoding unit 104, an inverse quantization/inverse transform unit 105, an adder 106, a local decoded image memory 107, an in-loop filtering 108, a frame buffer 109, a motion compensation unit 110, a depth intra-prediction unit 111, an intra-prediction unit 112, and a control unit 113.

Figure 2:
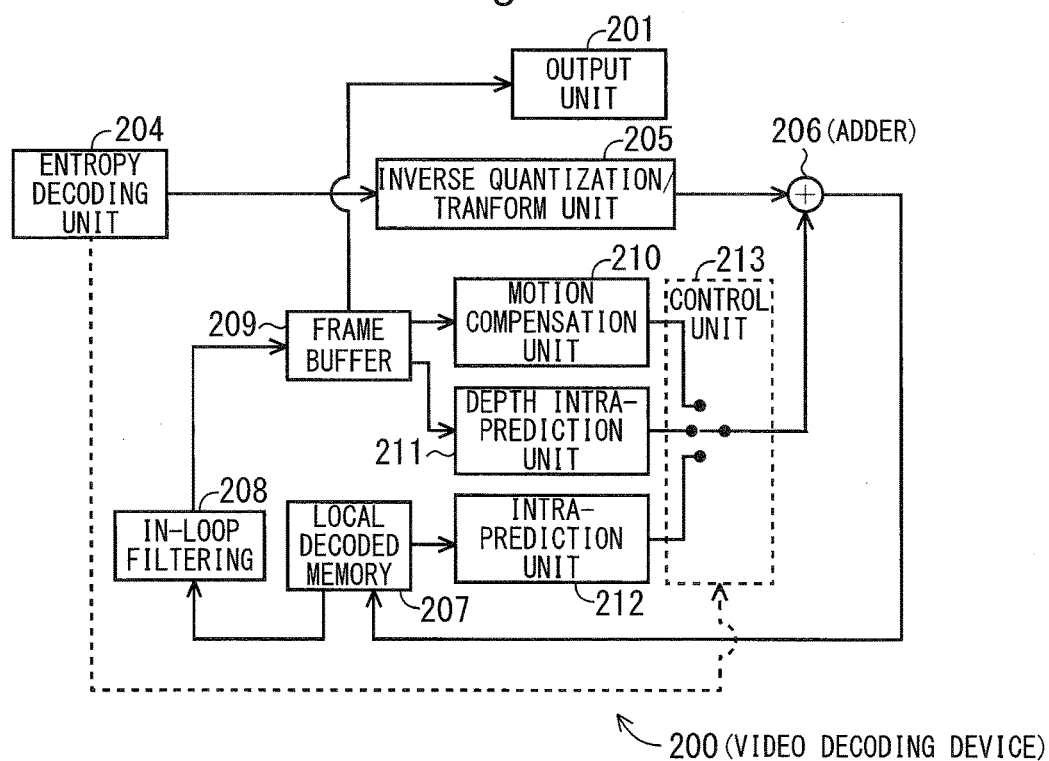
FIG. 2 is a functional block diagram of a video decoding device according to an embodiment.

FIG. 2 is a functional block diagram of a video decoding device according to an embodiment of the present invention. The video decoding device 200 includes an output unit 201, an entropy decoding unit 204, an inverse quantization/inverse transform unit 205, an adder 206, a local decoded image memory 207, an in-loop filtering 208, a frame buffer 209, a motion compensation unit 210, a depth intra-prediction unit 211, an intra-prediction unit 212, and a control unit 213.

Figure 10:
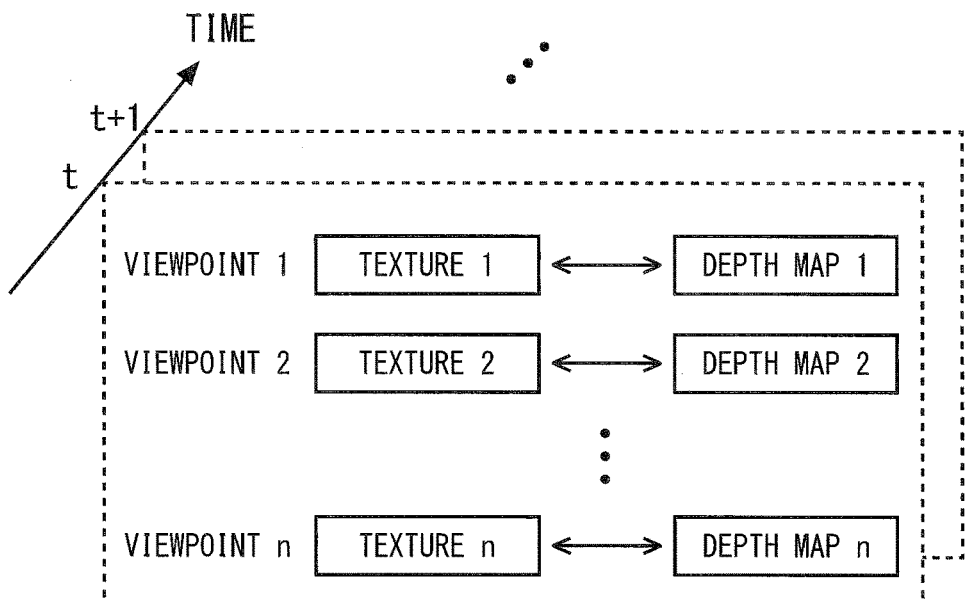
FIG. 10 is a view for describing a data configuration for which depth maps are associated with images (textures) at respective viewpoints in a multi-view video image.
Figure 11:
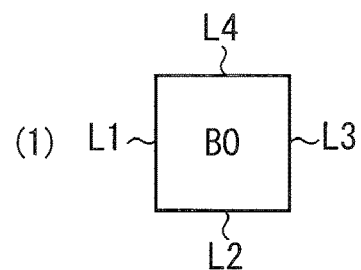
FIG. 11 includes views for describing a method for depth intra-prediction.
Figure 11:
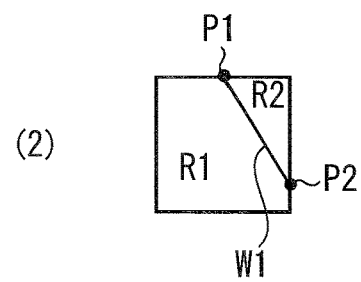

The video encoding device 100 is input with such data as described in FIG. 10 that depth maps are associated with textures at respective viewpoints in a multi-view video image, applies thereto various predictions etc., and then codes the same. The video decoding device 200 decodes said encoded data, applies thereto corresponding predictions etc., and then outputs data corresponding to the original data in FIG. 10.

Now, the video encoding device 100 will be abbreviated as an encoder, and the video decoding device 200 will be abbreviated as a decoder. The encoder and decoder shown in said FIG. 1 and FIG. 2, respectively, are the same in overall configuration itself as those disclosed in Non-Patent Literature 3 etc. A reduction in the amount of calculation of the present invention is achieved by a processing of the depth intra-prediction unit 111, 211.

In the following, the respective units of the encoder and decoder will be described in outline. In addition, identical or corresponding processings will be described with functional units of the encoder and decoder mentioned one after the other or designated by respective reference signs in juxtaposition.

The input unit 101 receives the data in FIG. 10 as an input of the encoder side, and passes said data to the differentiator 102. The output unit 201 outputs, as an output of the decoder side, data corresponding to said data in FIG. 10 and having been decoded on the decoder side and stored in the frame buffer 209. The differentiator 102 determines a difference between a signal in the data received from the input unit 101 and a signal generated as a prediction signal thereof by any of the motion compensation unit 110, the depth intra-prediction unit 111, or the intra-prediction unit 112 based on a decision of the control unit 113, and passes a value of said difference to the transform/quantization unit 103.

The transform/quantization unit 103 orthogonally transforms in a block unit the difference obtained from the differentiator 102 into a transformed coefficient, and further quantizes said transformed coefficient to pass a quantized value to the entropy encoding unit 104 and the inverse quantization/inverse transform unit 105. The entropy encoding unit 104 entropy-codes the quantized value obtained from the transform/quantization unit 103 and a prediction parameter or the like appropriately output by the control unit 113 according to necessity into an output of the encoder side.

The entropy decoding unit 204 receives as an input of the decoder side a bit stream output from the entropy encoding unit 104 by the encoder side, and entropy-decodes the same into a quantized value and a prediction parameter or the like. The quantized value is passed to the inverse quantization/inverse transform unit 205, and the prediction parameter or the like is passed to the control unit 213.

The inverse quantization/inverse transform unit 105 (inverse quantization/inverse transform unit 205) inversely quantizes and inversely transforms the quantized value received from the transform/quantization unit 103 (entropy decoding unit 204) by an inverse processing of the transform/quantization unit 103 into a residual value, and passes the same to the adder 106, 206.

The adder 106, 206 adds a prediction signal generated by any of the motion compensation unit 110, 210, the depth intra-prediction unit 111, 211, or the intra-prediction unit 112, 212 based on a decision of the control unit 113, 213 and the residual value output by inverse quantization/inverse transform unit 105, 205 into a decoded signal, and passes said decoded signal to the local-decoded image memory 107, 207.

The local decoded image memory 107, 207 holds said decoded signal for use as a reference when the intra-prediction unit 112, 212 performs prediction, and outputs said decoded signal to the in-loop filtering 108, 208. The in-loop filtering 108, 208 applies in-loop filtering to said decoded signal, and outputs the same to the frame buffer 109, 209.

The frame buffer 109, 209 holds the filtered signal for use as a reference when the motion compensation unit 110, 210 and the depth intra-prediction unit 111, 211 perform prediction. On the decoder side, as in the foregoing, the frame buffer 209 passes said filtered signal to the output unit 201 as a decoder output.

The motion compensation unit 110, 210 performs motion prediction using the reference signal of the frame buffer 109, 209, generates a prediction signal, and passes the same to the differentiator 102 and the adder 106 (on the decoder side, only the adder 206). A prediction parameter such as a motion vector is, on the encoder side, generated when a prediction signal is generated, and encoded, whereas, on the decoder side, it is used when a prediction signal is generated.

The depth intra-prediction unit 111,211 according to the present invention generates prediction signals of two regions when a block is partitioned by a wedgelet with which the SAD value (which may otherwise be other difference evaluation values as to be described later) is minimized as in the foregoing as a prediction signal of the block using the reference signal of the frame buffer 109, 209, and passes the same to the differentiator 102 and the adder 106 (on the decoder side, only the adder 206). A prediction parameter or the like will be described later.

The intra-prediction unit 112, 212 performs intra-prediction using the reference signal of the local decoded image memory 107, 207, generates a prediction signal, and passes the same to the differentiator 102 and the adder 106 (on the decoder side, only the adder 206). A prediction parameter such as a prediction mode is, on the decoder side, generated when a prediction signal is generated, and encoded, whereas, on the encoder side, it is used when a prediction signal is generated.

The control unit 113, 213 performs comprehensive control, for data configured as in FIG. 10, as to in what order and applying what prediction textures and depth maps at respective viewpoints are encoded and decoded. Said control includes a block size setting and the like. On the encoder side, a parameter or the like necessary for said control is encoded, and on the decoder side, a parameter is decoded and passed to a functional unit that requires the same.

On the encoder side, the control unit 113, if a prediction parameter is generated in any of the prediction units 110, 111, and 112, passes the same to the entropy encoding unit 104. On the decoder side, if a prediction parameter is decoded, the control unit 213 passes the same to a corresponding prediction portion (the motion compensation unit 210, the depth intra-prediction unit 211, or the intra-prediction unit 212). In addition, in FIG. 1 and FIG. 2, transfer flows of prediction parameters between said control unit 113 or 213 and the prediction unit 110, 111, 112 or 210, 211, 212 are omitted from being drawn in order to avoid complicating the figures.

By such an encoder and decoder as above, textures can be encoded and decoded in the same manner as the conventional method, using the units other than the depth intra-prediction unit 111, 211. Although this is not illustrated, the encoder and decoder may further include inter-view prediction units for applying prediction between viewpoints as fourth prediction units so as to apply inter-view prediction.

On the other hand, depth maps can be encoded and decoded by the same method as that for the textures described above, and the depth intra-prediction unit 111, 211 can also be applied thereto.

Figure 3:
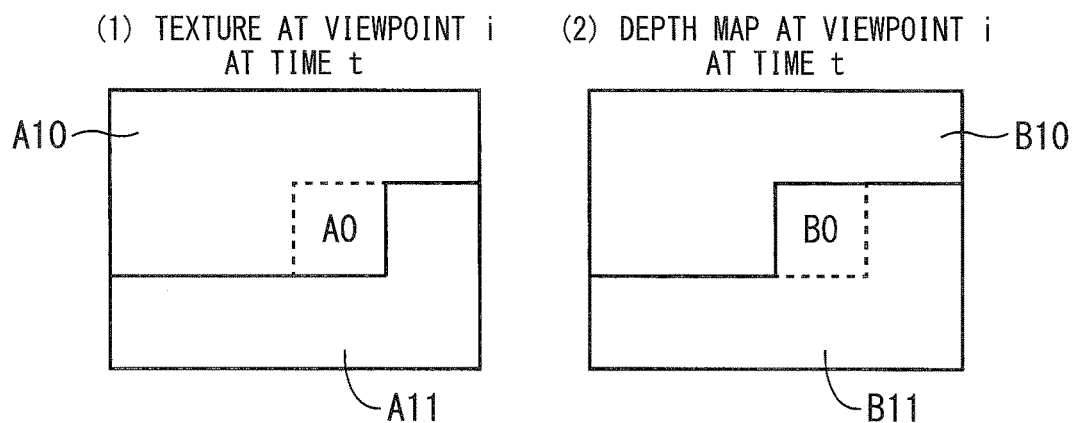
FIG. 3 shows an example of an encoding procedure (decoding procedure) when depth intra-prediction is applied.

FIG. 3 shows an example of the order of encoding/decoding when depth intra-prediction is applied. As shown in FIG. 3(2), the depth map at a time t at a viewpoint i (i=1, 2, n) has already been encoded and decoded in the part of B10 in a raster scanning order, and has not yet been encoded and decoded in the region B11 from the block B0 onward that is an encoding and decoding target at the present moment. In addition, it is not always necessary that the respective blocks in the part of B10 have been applied with a depth intra-prediction, and may have been applied with another intra-prediction or the like.

On the other hand, as shown in FIG. 3(1), in the texture at the same viewpoint i and the same time t, the block A0 at the same location as that of the block B0 in the depth map has already been encoded and decoded. Also, the region A10 up to the block A0 in a raster scanning order has already been encoded and decoded. The region A11 after the block A0 may have already or may have not yet been encoded and decoded.

When encoding and decoding such a block B0 in a depth map of an encoding and decoding target, for example, the following first mode and second mode can be used.

In the first mode, depth intra-prediction is applied to values of the depth map at said block B0 before encoding. Accordingly, on the encoder side, information for identifying which wedgelet Wi was used is generated as prediction information, and encoded, prediction signals (representative values of the respective regions in the foregoing) of two regions partitioned by said Wi are generated and encoded, and differences between depth values before encoding and said prediction signals are encoded. On the decoder side, the wedgelet Wi, the prediction signals, and the differences are decoded and added to thereby decode depth values.

Thus, in the first mode, a reduction in the amount of calculation by the present invention can be applied to only the encoder side.

In the second mode, depth intra-prediction is applied to the target block B0 using the block A0 in a texture at the same viewpoint, the same location, and the same time having already been encoded and decoded. In addition, the second mode is on the assumption that the same object boundary as an object boundary presented in depth values is presented also in pixel values.

In the second mode, an optimal wedgelet Wi is determined from the block A0 having already been encoded and decoded, and therefore, signaling (coding and decoding) of said Wi is unnecessary. Signaling targets are representative values of respective regions of the block B0 partitioned by said Wi and differences from the representative values in the respective regions.

Thus, in the second mode, a reduction in the amount of calculation by the present invention can be applied to both the encoder and decoder.

The two patterns of encoding and decoding processings exemplified as above are available, but even when another encoding and decoding processing is applied, the present invention is applicable if a wedgelet search is carried out. In the following, description will be given of the depth intra-prediction unit 111, 211 that achieves a reduction in the amount of calculation by the present invention.

Figure 4:
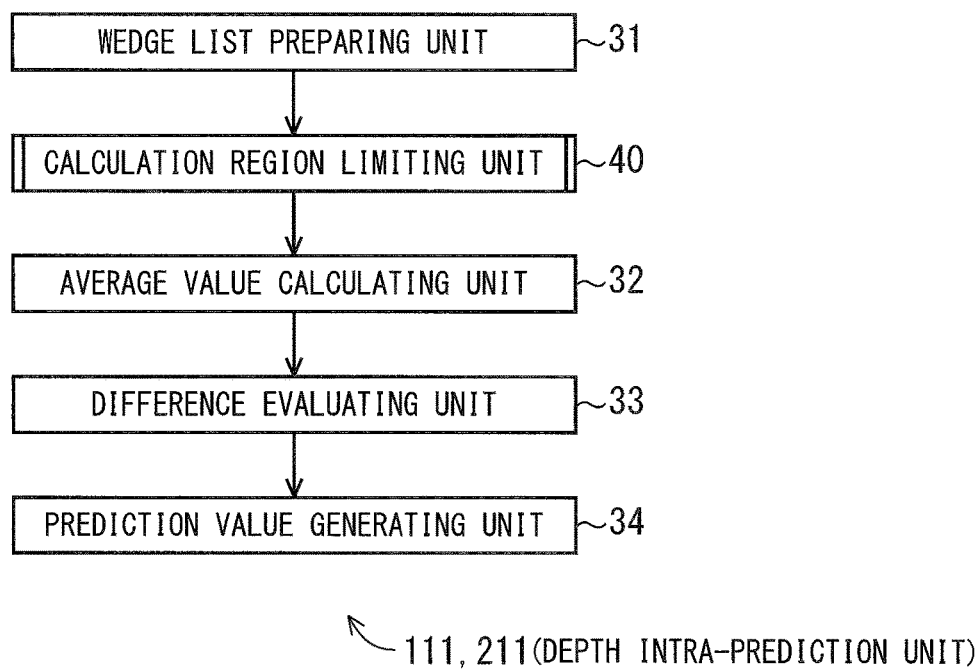
FIG. 4 is a functional block diagram of a depth intra-prediction unit.

FIG. 4 is a functional block diagram of the depth intra-prediction unit 111, 211 that is in common between the encoder and decoder. Although various encoding and decoding processings exist as mentioned above, in said functional blocks, only the part that achieves a reduction in the amount of calculation, which is in common between the encoder and decoder, will be described.

The depth intra-prediction unit 111, 211 includes a wedge list preparing unit 31, a calculation region limiting unit 40, an average value calculating unit 32, a difference evaluating unit 33, and a prediction value generating unit 34. Here, particularly in the configuration that skips the calculation region limiting unit 40 (configuration in which the calculation region limiting unit 40 is omitted), a processing identical to that of the foregoing [procedure 1] to [procedure 4] is realized in an embodiment. In the present invention, particularly by the processing of the calculation region limiting unit 40 being added after [procedure 1] and [procedure 2] onward being carried out under said processing, the effect of a reduction in the amount of calculation is achieved.

The wedge list preparing unit 31 takes charge of the foregoing [procedure 1]. That is, the wedge list preparing unit 31 prepares a wedge list of a block being a target, and passes the wedge list to the calculation region limiting unit 40. In addition, because all combinations of two points selected to constitute a wedgelet are fixedly determined according to the block size, it basically suffices for the wedge list preparing unit 31 to hold a wedge list as said predetermined combinations and pass the same to the calculation region limiting unit 40. Moreover, it suffices; when the following specific instruction is made, to dynamically perform selection from said held wedge list to thereby prepare a wedge list for practical use in a form following said instruction and pass the same to the calculation region limiting unit 40.

Figure 12:
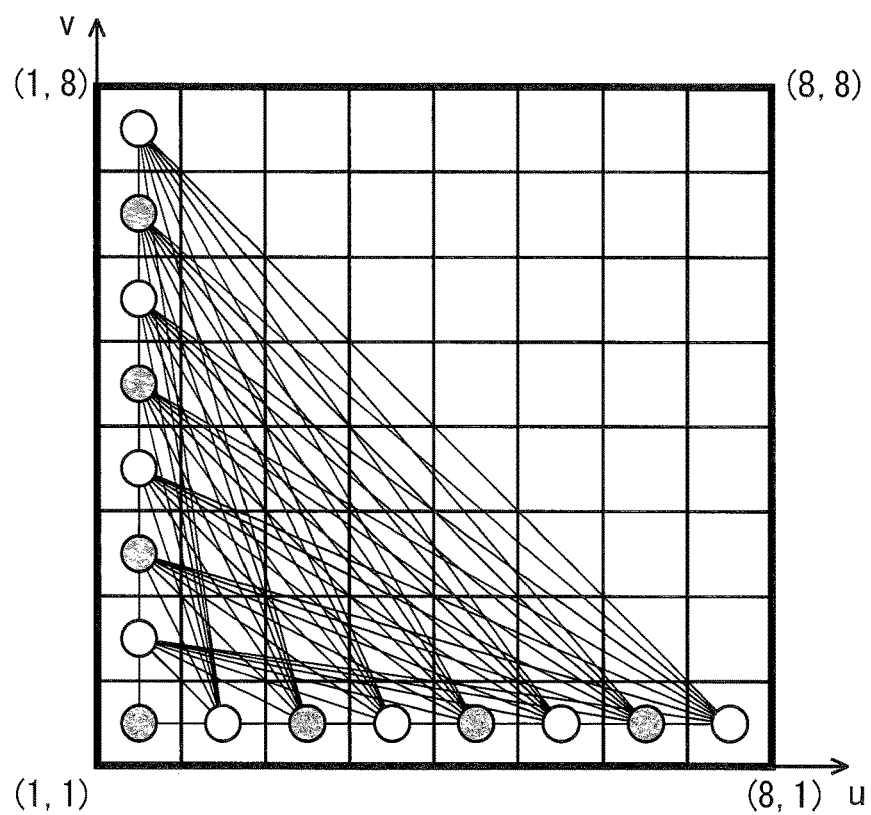
FIG. 12 is a view for describing a two-step search as one of the means for reducing the amount of calculation of a wedgelet search.
Figure 13:
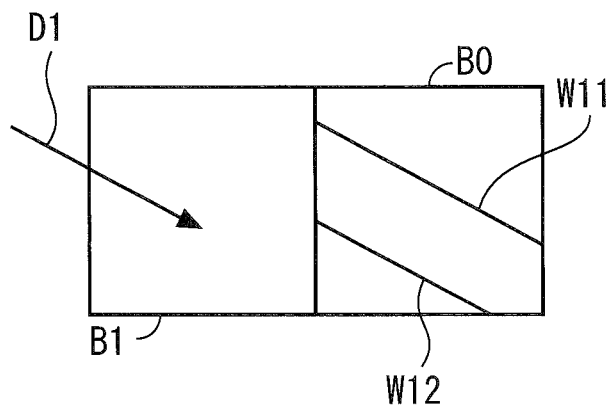
FIG. 13 is a view for describing using a predicting direction of intra-prediction applied to a neighborhood block as a means for reducing the amount of calculation of a wedgelet search.

That is, the wedge list preparing unit 31 may also prepare a wedge list for which the above-described previously held all combinations are reduced in the number of combinations by some limit. For example, under the instruction from the control unit 113, 213, the wedge list may be prepared as one limited by the method in FIG. 12 or FIG. 13.

The calculation region limiting unit 40, with respect to each of the wedgelets Wi (i=1, 2, . . . , N) that belong to a wedge list received from the wedge list preparing unit 31, limits a region to be a target of calculation by the average value calculating unit 32 and the difference evaluating unit 33 at the subsequent stages only to a vicinity of where said Wi passes within a target block. A further limit may be added in said vicinity. Therefore, for each wedgelet Wi, a predetermined combination of two regions Ri[1] and Ri[2] limited within a block is prepared in advance.

That is, where two regions in a block as a whole partitioned by a wedgelet Wi are provided as $Ri[1]_{all}$ and $Ri[2]_{all}$, said two regions Ri[1] and Ri[2] have the following relationships of subsets, respectively:

$$Ri[1] \subset R[1]_{all} \quad \text{(Expression 2-1)}$$

$$Ri[2] \subset R[2]_{all} \quad \text{(Expression 2-2)}$$

The Ri[1] and Ri[2] are not necessarily connected regions, respectively.

The average value calculating unit 32 limits a calculation target to said two regions Ri[1] and Ri[2], and as in the following (Expression 3), then carries out [procedure 3] for each wedgelet Wi to determine an average value m(Ri[j]) (j=1, 2) in each of the limited regions.

[Equation 2]

$$m(Ri[j]) = \frac{\sum_{(x,y) \in Ri[j]} s(x, y)}{Mj} \quad \text{(Expression 3)}$$

Here, j=1, 2
Mj represents the number of points that belong to region Ri[j].

The difference evaluating unit 33 also likewise limits a calculation target to said two regions Ri[1] and Ri[2], and as in the following (Expression 4), then carries out [procedure 4] for each wedgelet Wi to determine Wi with which a difference is minimized as a SAD value. Accordingly, the number of SADs etc., to be calculated is reduced, so that the amount of calculation per one wedgelet is reduced. In addition, when each wedgelet Wi is not constant in the size of two regions Ri[1] and Ri[2] (=number of pixels Ni of two regions) corresponding thereto, it is preferable to further divide a SAD value to be calculated in the following by said number of pixels Ni for standardization so as to thereby determine such Wi that said standardized SAD value is minimized.

[Equation 3]

$$SAD[Wi] = \sum_{(x,y) \in Ri[1]} |s(x, y) - m(Ri[1])| + \sum_{(x,y) \in Ri[2]} |s(x, y) - m(Ri[2])| \quad \text{(Expression 4)}$$

In addition, the difference evaluating unit 33 does not need to always use a SAD for a difference evaluation, and may evaluate the magnitude of a difference using another calculation method based on an absolute difference value such as the sum of the n-th power of an absolute difference value. For example, the difference may be evaluated by a sum of squared difference (SSD) based on n=2. Other functions or methods for evaluating the degree of matching between regions may be used to carry out a difference evaluation.

The prediction value generating unit 34 generates prediction signals of depth values by [procedure 4] in terms of the above-described wedgelet Wi with which a difference is minimized. In addition, a target for said generation is not limited to Ri[1] and Ri[2] but is Ri[1]$_{all}$ and Ri[2]$_{all}$ for which a target block as a whole is partitioned into two. That is, representative values are determined in said Ri[1]all and Ri[2]all for which a target block for depth values as a whole is partitioned into two, and then said representative values are used as prediction signals. The representative values in said Ri[1]$_{all}$ and Ri[2]$_{all}$ for which the whole is partitioned into two may be determined respectively as average values of the regions Ri[1] all and Ri[2]$_{all}$, or may alternatively adopt respective average values in the regions Ri[1] and Ri[2] that have already been calculated in the average value calculating unit 32.

In the following, the calculation region limiting unit 40 will be described in detail.

Examples of a method for previously setting said two regions Ri[1] and Ri[2] for each wedgelet Wi in the calculation region limiting unit 40 includes the following. A block being a target is partitioned into predetermined sub-blocks, and in each sub-block, if a threshold determination that the passing length of the wedgelet Wi is a predetermined value or more or at a predetermined rate or more to the sub-block size is satisfied, said sub-block is included in a calculation target region, and if it not satisfied (including a case where the wedgelet does not pass the sub-block), said sub-block is excluded.

Or, in consideration of a passing location within the sub-block of the wedgelet Wi (a passing region that is defined as a series of pixel locations the wedgelet crosses) in place of or in addition to the above-mentioned determination based on the length or rate, whether to include said sub-block in a calculation target region with the wedgelet Wi may be determined according to a predetermined condition for said location (region).

Figure 5:
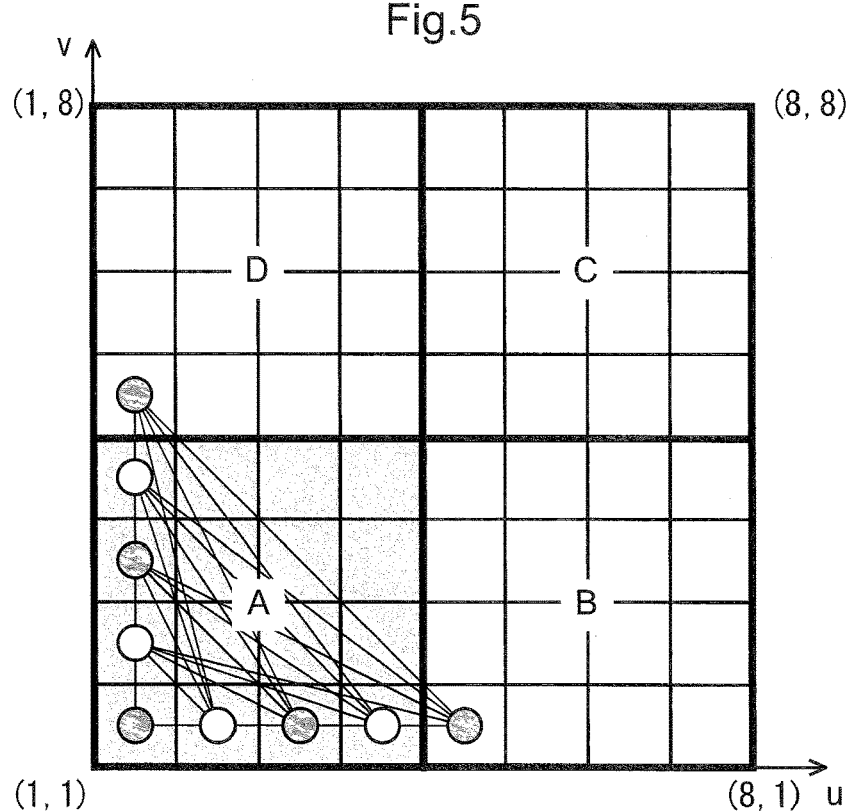
FIG. 5 is a view showing an example for conceptually describing region limitation by a calculation region limiting unit.
Figure 6:
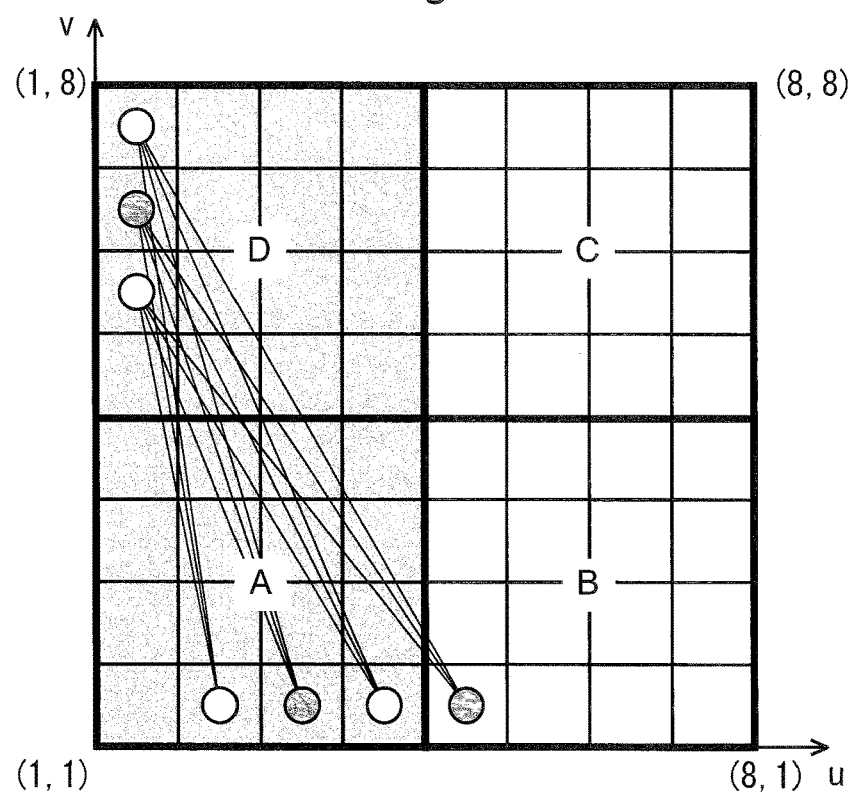
FIG. 6 is a view showing an example for conceptually describing region limitation by a calculation region limiting unit.
Figure 7:
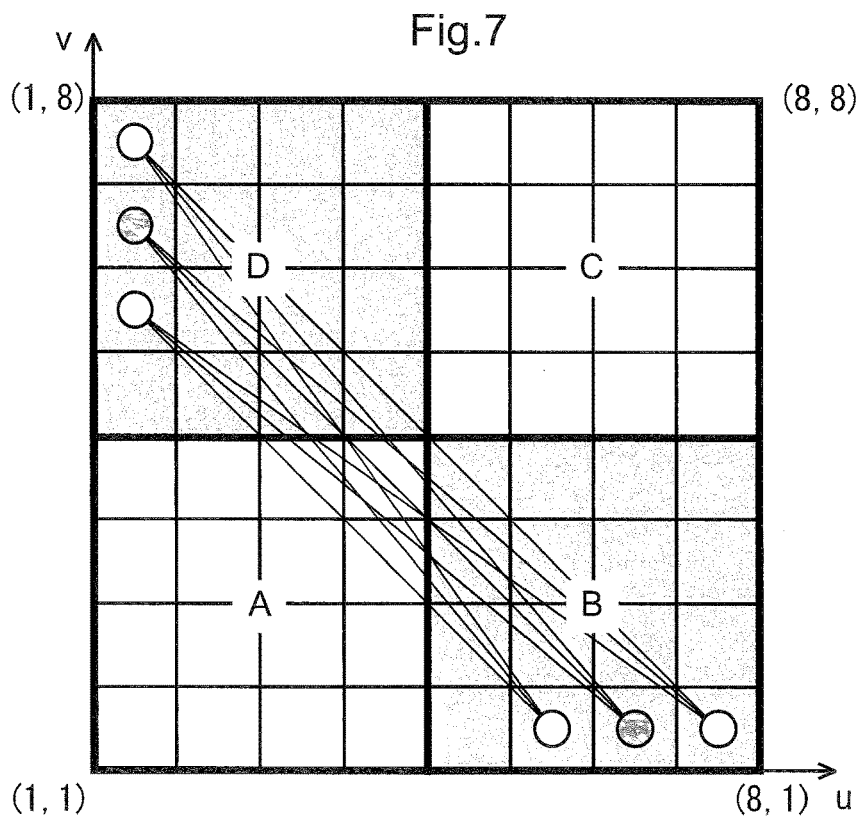
FIG. 7 is a view showing an example for conceptually describing region limitation by a calculation region limiting unit.

FIG. 5 to FIG. 7 show conceptual examples of the above-mentioned method, and here, all take examples where the target block has a size of 8×8 and is separated into four sub-blocks A, B, C, and D having a common size of 4×4. For referring to coordinates in the block, coordinates that are in common with those described in FIG. 12 will be used. Here, the partition into sub-blocks having a common size provides an effect that because of a calculation in a sub-block unit, an identical operation can be applied to consecutive pixels, which enables parallelization by a SIMD function or hardware.

In addition, generally, each wedgelet Wi may be different in the partitioning method into sub-blocks, and a target block having a desired size may also be used. In the case of partition into sub-blocks, (although this is not always preferred for parallelization and the like) the sub-blocks may be different in shape from each other.

FIG. 5 shows an example of such a series of wedgelets Wi that are expressed by "Ri[1]∪Ri[2]=A." For example, the wedgelet connecting (5, 1) and (1, 5) also passes the regions B and D, but the passing part is slight and is therefore not included in a calculation region.

FIG. 6 shows an example of such a series of wedgelets Wi that are expressed by "Ri[1]∪Ri[2]=A∪D." For example, the wedgelet connecting (5, 1) and (1, 8) also passes the region B, but the passing part is slight and is therefore not included in a calculation region.

FIG. 7 shows an example of such a series of wedgelets Wi that are expressed by "Ri[1]∪Ri[2]=B∪D." Here, all eight wedgelets other than one wedgelet connecting (1, 8) and (8, 1) also pass the region A, but the passing part is slight and is therefore not included in a calculation region.

Hereinafter, respective embodiments and others will be described based on methods from the above-described perspective on the passing part. (In addition, the following third and fourth embodiments can be carried out without depending on the passing part.)

(First Embodiment)

Figure 8:
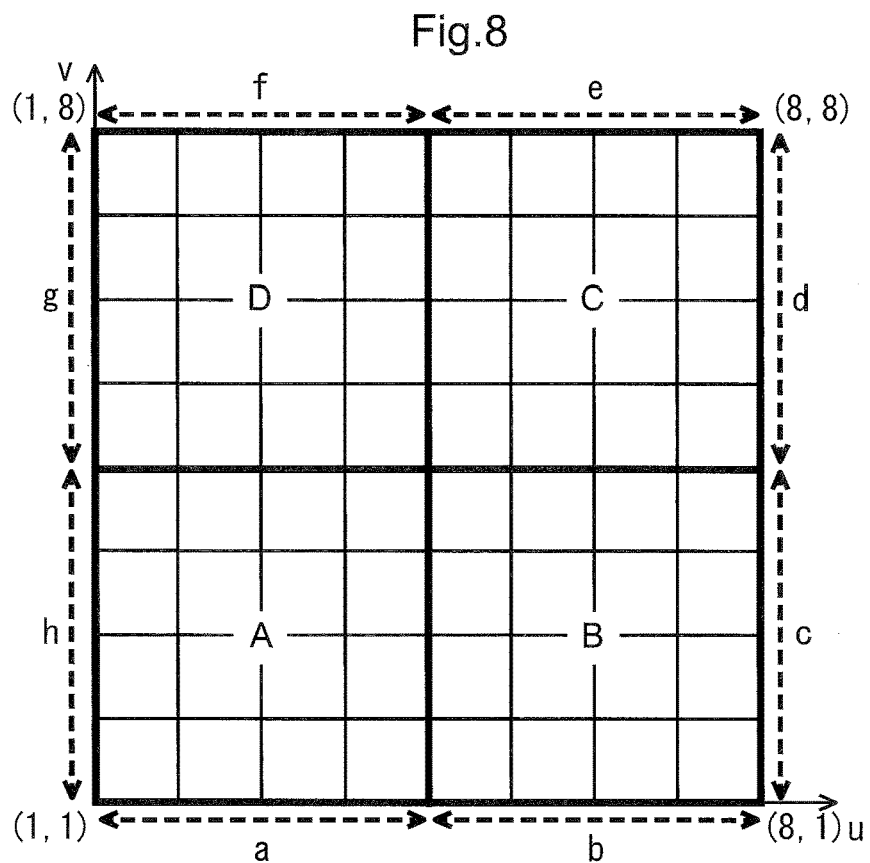
FIG. 8 is a view showing an example of calculation region determinations according to a first embodiment.

FIG. 8 is a view showing an example of calculation region determinations according to a first embodiment. The target block size, coordinate assignment, and partition into the sub-blocks A, B, C, and D are in common with those of the examples in FIG. 5 to FIG. 7. In FIG. 8, respective sides that are the sides of the sub-blocks A, B, C, and D and can be end points of wedgelets are shown as a to h. For example, the side at a lower side of the sub-block A corresponds to a, and the side at a left side thereof corresponds to h.

In the first embodiment, a calculation region can be determined in a limited manner to predetermined sub-blocks, based on which of the respective sides of said sub-blocks A, B, C, and D the wedgelet has as two end points, in accordance with the following case identifying rules (1) to (5).

(1) Use A and B as a calculation region:
When a combination of the start point and end point of a wedgelet is any of (h, a), (h, b), (h, c), (c, a), (c, b), and (a, b)

(2) Use C and D as a calculation region:
When a combination of the start point and end point of a wedgelet is any of (d, e), (d, f), (d, g), (e, f), (e, g), and (f, g)

(3) Use A and D as a calculation region:
When a combination of the start point and end point of a wedgelet is any of (a, f), (a, g), (h, f), and (g, h)

(4) Use B and C as a calculation region:
When a combination of the start point and end point of a wedgelet is any of (b, e), (b, d), (c, e), and (c, d)

(5) Use A, B, C, and D as a calculation region:
When a combination of the start point and end point of a wedgelet is other than the above (1) to (4)

(Second Embodiment)

Figure 9:
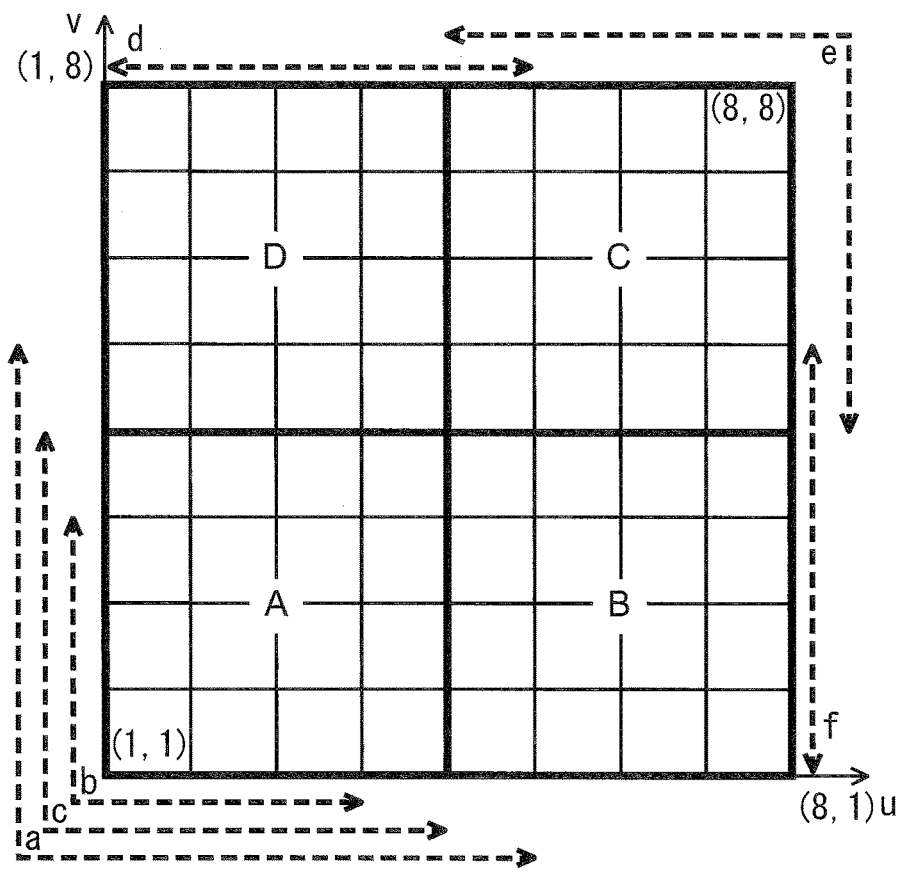
FIG. 9 is a view showing an example of calculation region determinations according to a second embodiment.

FIG. 9 is a view showing an example of calculation region determinations according to a second embodiment. The target block size, coordinate assignment, and partition into the sub-blocks A, B, C, and D are in common with those of the examples in FIG. 5 to FIG. 7. In FIG. 9, broken lines a, c, b, and e respectively represent L-shaped block boundary parts as illustrated. For example, the broken line a represents an L-shaped region located from (1, 5) to (1, 1) to (5, 1). Likewise, the broken lines d and f are boundary parts as line segments, and for example, d represents a segment from (1, 8) to (5, 8).

In FIG. 9, an example of determinations of a calculation region when at least one end of a wedgelet is present within or in a vicinity of the sub-block A. Accordingly, this method can likewise be applied (by switching block designations) to cases where at least one end of a wedgelet is present inside or in a vicinity of any of the sub-blocks B, C, and D.

In FIG. 9, specifically, a calculation region is determined by the following case identification. In this case, the calculation region is inevitably reduced to a half, and the amount of calculation is reliably reduced.

(1) Use only A:
  When a combination of the start point and end point of a wedgelet is in a range of the broken line a
(2) Use A and B:
  When the start point of a wedgelet is in a range of the broken line b and the end point is in a range of the broken line f
(3) Use A and D:
  When the start point of a wedgelet is in a range of the broken line b and the end point is in a range of the broken line d
(4) Use A and C:
  When the start point of a wedgelet is in a range of the broken line c and the end point is in a range of the broken line e In addition, the first and second embodiments can be applied to a video encoding system 3D-HEVC.

(Third Embodiment)

Figure 14:
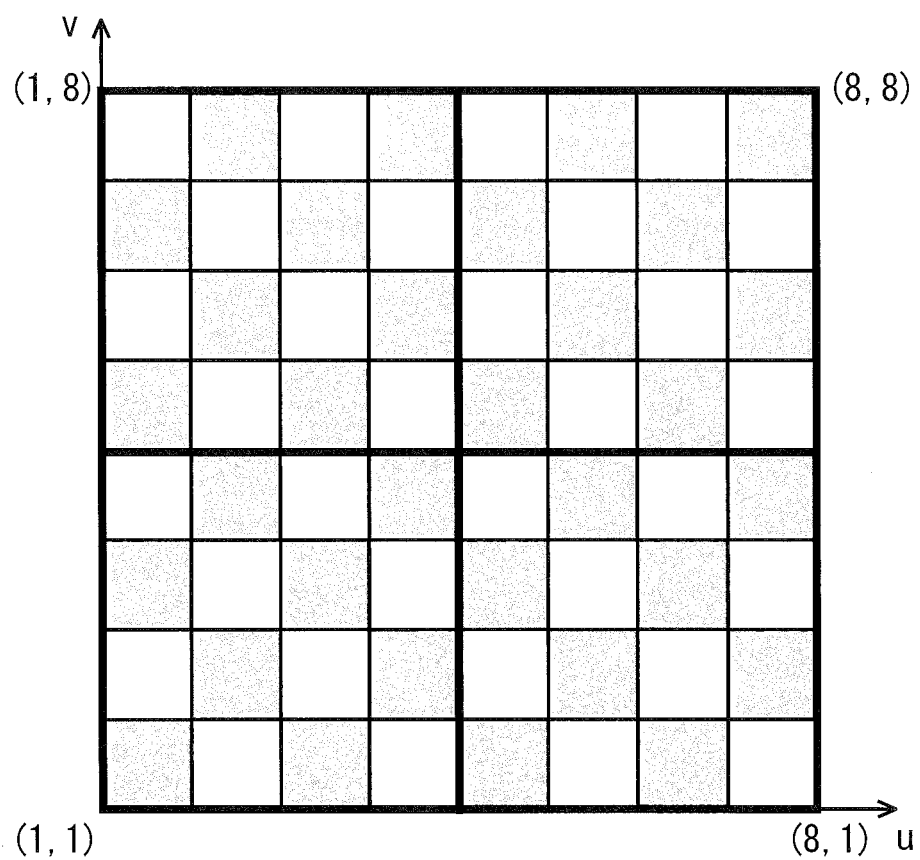
FIG. 14 is a view showing an example of a calculation region determination according to a third embodiment.

FIG. 14 is a view for describing a third embodiment. The block size and other conditions are in common with those of the examples in FIG. 5 to FIG. 7. In the third embodiment, to the target block, a uniform thinning-out processing is applied to limit a calculation target region.

In the example of FIG. 14, as an example of the thinning-out processing, the target block is separated in a checkerboard pattern, and only either of the separated regions is used as a calculation target. That is, for each location (u, v) in the block, a distinction is made between an even number region (region where u+v equals an odd number) shown in gray in the view and an odd number region (region where u+v equals an odd number), and only either of said even number regions or odd number regions is used as a calculation region. Various other methods for thinning out every n+1 points can likewise be applied. Said thinning-out rate n may be changed between a horizontal direction and a vertical direction. Thinning-out may be carried out assuming a straight or curved line in another direction.

(Fourth Embodiment)

In a fourth embodiment, if the size of a block being a target is determined to be small by a predetermined criterion, application of the calculation region limiting unit 40 is skipped. For example, in the case of a 4×4-sized block, the calculation region limiting unit 40 is not used.

As above, the first to third embodiments can be respectively solely carried out. The fourth embodiment can be carried out in combination with another embodiment. The third embodiment can not only be solely carried out but be carried out also in combination with another embodiment. That is, besides limiting a calculation region to a specific sub-block(s) in the first or second embodiment, thinning-out according to the third embodiment may be subsequently carried out in said limited sub-block.

In addition, the first and second embodiments are also examples in which, for each wedgelet, a predetermined setting is previously provided as to how sub-blocks to limit a calculation region are set. Particularly, the first and second embodiments are examples in which, for each wedgelet, a predetermined setting of a sub-block to limit a calculation region is provided for each of the respective ranges where the points at both ends of said wedgelet exist. As a fundamental concept for previously performing said predetermined setting by hand, the wedgelet passing region in the foregoing can be focused on, but an exceptional setting can also be performed.

In addition, the present invention can be provided as a video encoding program that makes a computer function as the respective units in FIG. 1 or makes a computer execute steps corresponding to the respective units in FIG. 1. Similarly, the present invention can be provided as a video encoding program that makes a computer function as the respective units in FIG. 2 or makes a computer execute steps corresponding to the respective units in FIG. 2. Further, said each program may be provided by being recorded on a computer-readable reading medium.

REFERENCE SIGNS LIST

100 . . . Video encoding device, 200 . . . Video decoding device, 111,211 . . . Depth intra-prediction unit, 31 . . . Wedge list preparing unit, 40 . . . Calculation region limiting unit, 32 . . . Average value calculating unit, 33 . . . Difference evaluating unit, 34 . . . Prediction value generating unit.

The invention claimed is:

1. A video encoding device which applies prediction to textures and depth maps at respective viewpoints in a multi-view video image and performs transformation and quantization for encoding, the video encoding device comprising:
  a processor; and
  a non-transitory storage medium storing a set of instructions configured to cause the processor to perform a depth intra-prediction process that applies prediction for a depth map, said depth intra-prediction process comprising:
  a wedge list preparing process that prepares or holds a wedge list in which wedgelets each partitioning a target block into two regions by a line segment are enumerated;
  a calculation region limiting process that, with respect to each wedgelet in the wedge list, limits a difference calculation target region to a neighborhood of where said wedgelet passes within a target block, wherein the limited difference calculation target region consists of a part of all the pixels within a target block;
  an average value calculating process that, in each of the regions partitioned in a target block into two by each wedgelet, calculates an average value of signals in the limited difference calculation region, thereby excluding pixels outside the limited difference calculation target region from the average value calculation target;
  a difference evaluating process that calculates, with respect to each wedgelet, a difference between the calculated average value and a signal in the limited difference calculation region, thereby excluding pixels outside the limited difference calculation target region from the difference evaluation target; and
  a prediction value generating process that partitions a target block into two regions by a wedgelet with which the calculated difference is minimized, and generates a prediction signal of a depth map as a representative value of depth signals in each region.

2. The video encoding device according to claim 1, wherein the calculation region limiting process partitions a target block into sub-blocks, and limits a difference calculation target region by determining whether to include each sub-block in a difference calculation target region with each wedgelet based on a region where said wedgelet passes in each sub-block.

3. The video encoding device according to claim 1, wherein the calculation region limiting process partitions a target block into sub-blocks, and if a condition that a length by which each wedgelet passes in each sub-block is a predetermined value or more or at a predetermined rate or more to a size of said sub-block is satisfied, includes said sub-block in a difference calculation target region, and if said condition is not satisfied, excludes said sub-block from a difference calculation target region.

4. The video encoding device according to claim 1, wherein the calculation region limiting process partitions a target block into sub-blocks, and limits a difference calculation target region to a predetermined sub-block previously set for each wedgelet.

5. The video encoding device according to claim 1, wherein the calculation region limiting process partitions a target block into sub-blocks, and limits a difference calculation target region to a predetermined sub-block previously set, for each wedgelet, in each of the ranges where points at both ends of said wedgelet exist.

6. The video encoding device according to claim 1, wherein the calculation region limiting process, if a size of a target block is determined to be small on a predetermined criterion, does not limit a difference calculation target region.

7. The video encoding device according to claim 1, wherein the calculation region limiting process limits a difference calculation target region by further performing a uniform thinning-out processing to the neighborhood.

8. A video decoding device which performs inverse transformation and inverse quantization when decoding textures and depth maps at respective viewpoints in a multi-view video image having been encoded and applies prediction for decoding, the video encoding device comprising:
    processor; and
    a non-transitory storage medium storing a set of instructions configured to cause the processor to perform a depth intra-prediction process that applies prediction for a depth map, said depth intra-prediction process comprising:
    a wedge list preparing process that prepares or holds a wedge list in which wedgelets each partitioning a target block into two regions by a line segment are enumerated;
    a calculation region limiting process that, with respect to each wedgelet in the wedge list, limits a difference calculation target region to a neighborhood of where said wedgelet passes within a target block, wherein the limited difference calculation target region consists of a part of all the pixels within a target block;
    an average value calculating process that, in each of the regions partitioned in a target block into two by each wedgelet, calculates an average value of texture signals in the limited difference calculation region, thereby excluding pixels outside the limited difference calculation target region from the average value calculation target;
    a difference evaluating process that calculates, with respect to each wedgelet, a difference between the calculated average value and a texture signal in the limited difference calculation region, thereby excluding pixels outside the limited difference calculation target region from the difference evaluation target; and
    a prediction value generating process that partitions a target block into two regions by a wedgelet with which the calculated difference is minimized, and generates a prediction signal of a depth map as a representative value of depth signals in each region.

9. The video decoding device according to claim 8, wherein the calculation region limiting process partitions a target block into sub-blocks, and limits a difference calculation target region by determining whether to include each sub-block in a difference calculation target region with each wedgelet based on a region where said wedgelet passes in each sub-block.

10. The video decoding device according to claim 8, wherein the calculation region limiting process partitions a target block into sub-blocks, and if a condition that a length by which each wedgelet passes in each sub-block is a predetermined value or more or at a predetermined rate or more to a size of said sub-block is satisfied, includes said sub-block in a difference calculation target region, and if said condition is not satisfied, excludes said sub-block from a difference calculation target region.

11. The video decoding device according to claim 8, wherein the calculation region limiting process partitions a target block into sub-blocks, and limits a difference calculation target region to a predetermined sub-block previously set for each wedgelet.

12. The video decoding device according to claim 8, wherein the calculation region limiting process partitions a target block into sub-blocks, and limits a difference calculation target region to a predetermined sub-block previously set, for each wedgelet, in each of the ranges where points at both ends of said wedgelet exist.

13. The video decoding device according to claim 8, wherein the calculation region limiting process, if a size of a target block is determined to be small on a predetermined criterion, does not limit a difference calculation target region.

14. The video decoding device according to claim 8, wherein the calculation region limiting process limits a difference calculation target region by further performing a uniform thinning-out processing to the neighborhood.

* * * * *

UNITED STATES PATENT AND TRADEMARK OFFICE
CERTIFICATE OF CORRECTION

PATENT NO.         : 10,356,402 B2
APPLICATION NO.    : 14/781131
DATED              : July 16, 2019
INVENTOR(S)        : Kei Kawamura et al.

It is certified that error appears in the above-identified patent and that said Letters Patent is hereby corrected as shown below:

In the Claims

Claim 8: Column 15, Line 31, delete "video encoding device" and insert --video decoding device--

Signed and Sealed this
Twenty-second Day of October, 2019

Andrei Iancu
*Director of the United States Patent and Trademark Office*